UNITED STATES PATENT OFFICE.

EMILE BRONNERT, OF MÜLHAUSEN, GERMANY.

PRODUCTION OF CELLULOSE SOLUTIONS FOR MANUFACTURING THREADS.

SPECIFICATION forming part of Letters Patent No. 646,381, dated March 27, 1900.

Application filed October 7, 1899. Serial No. 732,931. (No specimens.)

*To all whom it may concern:*

Be it known that I, EMILE BRONNERT, a citizen of Germany, residing at Niedermorschweiler, Mülhausen, Germany, have invented a certain new and useful Improvement in the Production of Cellulose Solutions Adapted for the Manufacture of Threads, (for which a patent has been applied for in Great Britain, dated June 27, 1899, No. 13,331; in Germany, dated May 1, 1899; in France, dated June 29, 1899, No. 278,371, and in Belgium, dated July 1, 1899, No. 143,569,) of which the following is a specification.

Many attempts have been made to spin fine lustrous threads from solutions of cellulose in ammoniacal solutions of cupric oxid. (See Despeissis, French Patent No. 203,741, of May 9, 1890; Pauly, French Patent No. 272,718, of December 1, 1897.) The failure of these attempts is in part due to the long time necessary for the production of the solutions and in part to the small proportion of cellulose dissolved, even when this is freed from fat and cut up. Thus the solutions can be spun only with difficulty and the thread produced has little strength.

The present invention relates to the speedy production from cellulose of a compound which dissolves immediately and easily in concentrated aqueous ammonia solution, the solution thus produced being of considerable stability, even at high temperatures, and adapted for the manufacture of thread. The contents of the solution in dry cellulose can be made easily some eight per cent. without unduly increasing the viscosity of the liquid, so that by expressing the solution through fine openings under dilute sulfuric acid threads of suitable strength and extensibility are obtained.

By this invention cotton wool freed from fat, bleached, and finely divided, or hydrocellulose, or oxycellulose, or any mixture of these, or any known form of cellulose hydrate is first converted into a condition suitable for reaction with chemical agents by treatment for about an hour with a solution of caustic soda of sixteen-per-cent. strength at a low temperature. For one molecular proportion of cellulose ($C_6H_{10}O_5$) or of one of the above-named derivatives about two molecular proportions of caustic soda should be used. The product of this treatment is intimately mixed, preferably in a ball-mill, with a quantity of a copper salt—such as copper sulfate, ($CuSO_4 \cdot 5H_2O$)—equivalent to the caustic soda used, avoiding any considerable rise of temperature. Under these conditions there is formed a compound of cellulose hydrate and cupric hydroxid which is decomposed into these constituents by water, but dissolves in concentrated ammonia solution to a dark-blue viscous liquid which is adapted for manufacture of films and lustrous threads.

Having thus described the nature of this invention and the best means I know of carrying the same into practical effect, I claim—

The process herein described for the production of cellulose solutions adapted for the manufacture of threads by first treating cellulose in a finely-divided state for about one hour with a cold concentrated solution of caustic alkali, then mixing the product with a powdered copper salt in proportion equivalent to the caustic alkali used, avoiding a rise of temperature, and finally dissolving the product in strong ammonia solution.

In testimony whereof I have hereunto set my hand in presence of two subscribing witnesses.

EMILE BRONNERT.

Witnesses:
EMMA ZETTER,
PAUL SCHLEIMBERGER.